(12) United States Patent
Fan et al.

(10) Patent No.: US 12,241,867 B1
(45) Date of Patent: Mar. 4, 2025

(54) HIGH-TEMPERATURE VIBRATION MODAL TESTING DEVICE FOR VARIABLE CROSS-SECTION CARBON FIBER RESIN-BASED COMPOSITES

(71) Applicant: NANJING UNIVERSITY OF AERONAUTICS AND ASTRONAUTICS, Nanjing (CN)

(72) Inventors: Congze Fan, Nanjing (CN); Jinghua Zheng, Nanjing (CN); Zhongde Shan, Nanjing (CN); Yiwei Chen, Nanjing (CN); Wenzhe Song, Nanjing (CN); Yufeng Jin, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/931,067

(22) Filed: Oct. 30, 2024

Related U.S. Application Data

(63) Continuation of application No. PCT/CN2024/083448, filed on Mar. 25, 2024.

(30) Foreign Application Priority Data

Jan. 15, 2024 (CN) .................. 202410050622.9

(51) Int. Cl.
*G01N 29/04* (2006.01)
*G01N 1/44* (2006.01)
*G01N 29/24* (2006.01)

(52) U.S. Cl.
CPC ............. *G01N 29/045* (2013.01); *G01N 1/44* (2013.01); *G01N 29/2418* (2013.01); *G01N 2291/0231* (2013.01)

(58) Field of Classification Search
CPC .... G01N 29/045; G01N 1/44; G01N 29/2418; G01N 2291/0231
See application file for complete search history.

(56) References Cited

U.S. PATENT DOCUMENTS

| 11,403,446 B1 | 8/2022 | Zhang et al. |
| 2023/0032755 A1 | 2/2023 | Gao et al. |

FOREIGN PATENT DOCUMENTS

| CN | 102539099 A | 7/2012 |
| CN | 103217265 A | 7/2013 |

(Continued)

OTHER PUBLICATIONS

He Erming, et al., Vibration mode evolution of 2D vowen C/SiC composite panels in hot environment, Acta Aeronautica et Astronautica Sinica, 2017, pp. 1-11, vol. 38 No. 7.

*Primary Examiner* — Tarun Sinha
(74) *Attorney, Agent, or Firm* — Bayramoglu Law Offices LLC

(57) ABSTRACT

A high-temperature vibration modal testing device for variable cross-section carbon fiber resin-based composites includes triangular serrated sliding rails, high-temperature steel sliding bayonets, sliding furnace door, water-cooled conduits, dual-axis sliding rail, insulation box, infrared radiation heating array, thin armored thermocouples, observation port, tapping threaded rod, tapping threaded fixture, ceramic force transmission rod, excitation source, laser vibration measurer, vibration measuring port, mechanical pump, and exhaust valve. A variable cross-section carbon fiber resin-based composite test piece is fixed to the high-temperature steel sliding bayonets and fixed to the tapping threaded fixture by the dual-axis sliding rail. During high-temperature vibration modal testing, the infrared radiation heating array provides a high-temperature thermal environment, the excitation source connected to the tapping (Continued)

threaded fixture provides random vibration, and thermal model measurement is performed through the laser vibration measurer. The device can perform high-temperature vibration modal testing on variable cross-section carbon fiber resin-based composites in aerospace flight environments.

9 Claims, 5 Drawing Sheets

(56) References Cited

FOREIGN PATENT DOCUMENTS

| | | | |
|---|---|---|---|
| CN | 103969137 | A | 8/2014 |
| CN | 110006612 | A | 7/2019 |
| CN | 216998235 | U | 7/2022 |
| CN | 117028078 | A | 11/2023 |
| CN | 117309657 | A | 12/2023 |
| CN | 117571242 | A | 2/2024 |
| JP | 2018009982 | A | 1/2018 |

HIGH-TEMPERATURE VIBRATION MODAL TESTING DEVICE FOR VARIABLE CROSS-SECTION CARBON FIBER RESIN-BASED COMPOSITES

CROSS REFERENCE TO THE RELATED APPLICATIONS

This application is a continuation application of International Application No. PCT/CN2024/083448, filed on Mar. 25, 2024, which is based upon and claims priority to Chinese Patent Application No. 202410050622.9, filed on Jan. 15, 2024, the entire contents of which are incorporated herein by reference.

TECHNICAL FIELD

The present invention relates to the field of aerospace, in particular to a high-temperature vibration modal testing device for variable cross-section carbon fiber resin-based composites.

BACKGROUND

Resin-based composites are widely used in the fields of automotive industry, transportation industry, aviation industry, etc. due to their properties such as light weight, high strength, high stiffness, and good corrosion resistance. At present, composites account for 20-50% of the total structural weight of advanced aircraft in the world, mainly used in wings, fuselage, turbine blades, satellite antenna covers, fairings, rocket engines, etc. However, with the development of research on ultra-high-speed aircraft, more and more scholars have begun to pay attention to the changes in the performance of resin-based composite structures in extreme flight environments. Especially the strong aerodynamic load in the flight process and the resulting uneven thermal deformation and thermal stress inside the structures in high temperature environments (above 1000° C.) change the stiffness of the structures, thereby changing the modal characteristics of the structures and then affecting the stability and controllability of the flight process of the aircraft. Therefore, building a high-temperature vibration modal testing device to simulate the vibration environment and thermal environment in the flight process, conduct high-temperature modal testing on carbon fiber resin-based composite structures under different thermal coupling conditions, and obtain high-temperature vibration modal parameters is of great significance to guide and verify the feasibility of designing aircraft in extreme flight environments.

Among existing high-temperature vibration modal devices, most are built for alloy structures, and only some conduct modal testing on carbon fiber resin-based composites but have not yet conducted thermal modal testing in environments above 1000° C. In addition, existing carbon fiber resin-based composite structures withstand high temperature environments above 1000° C. during flight, but high-temperature acceleration sensors withstand a maximum temperature of 650° C. Therefore, the conventional method of attaching an acceleration sensor to the surface of a material to obtain dynamic vibration signals is not applicable. Meanwhile, when carbon fiber resin-based composites are heated at high temperatures, the resin decomposes to produce a lot of gas, which has a great impact on the experimental environment and the health of experimental personnel. Therefore, researchers urgently need to build a high-temperature modal testing device for carbon fiber resin-based composites at temperatures above 1000° C. and develop a method capable of obtaining high-temperature modal parameters in a safe and controllable experimental environment.

SUMMARY

To solve the above problems, the present invention discloses a high-temperature vibration modal testing device suitable for variable cross-section carbon fiber resin-based composites. The device can provide a thermal vibration high-temperature environment of over 1000° C. for carbon fiber resin-based composite test pieces and obtain the change law of high-temperature vibration modal response, and can form a closed space for effectively processing decomposed gases and provide a stable, safe and reliable experimental environment. The device provides experimental basis for the stability and design feasibility of variable cross-section carbon fiber resin composite structures in aerospace flight environments.

A high-temperature vibration modal testing device for variable cross-section carbon fiber resin-based composites includes: a variable cross-section carbon fiber resin-based composite test piece, triangular serrated sliding rails, high-temperature steel sliding bayonets, a sliding furnace door, water-cooled conduits, a dual-axis sliding rail, an insulation box, an infrared radiation heating array, thin armored thermocouples, an observation port, a tapping threaded rod, a tapping threaded fixture, a ceramic force transmission rod, an excitation source, a laser vibration measurer, a vibration measuring port, a mechanical pump, an exhaust valve, connecting rods I, connecting rods II, a flange plate I, and a flange plate II; the variable cross-section carbon fiber resin-based composite test piece is fixed to the sliding furnace door by steel bolts, the triangular serrated sliding rails, and the high-temperature steel sliding bayonets to form a cantilever structure;

The sliding furnace door transports the variable cross-section carbon fiber resin-based composite test piece to the tapping threaded fixture through the dual-axis sliding rail to clamp one end of the variable cross-section carbon fiber resin-based composite test piece; the excitation source applies random vibration to the variable cross-section carbon fiber resin-based composite test piece through the high-temperature resistant ceramic force transmission rod and the tapping threaded fixture; the infrared radiation heating array is arranged at an upper end of the variable cross-section carbon fiber resin-based composite test piece, and can provide a high temperature above 1000° C. to simulate a real environment of single-sided high temperature heating during flight; laser from the laser vibration measurer at the top of the insulation box passes through infrared radiation tubes through the vibration measuring port and acts on the variable cross-section carbon fiber resin-based composite test piece, to measure the high-temperature vibration response of the variable cross-section carbon fiber resin-based composite test piece and obtain high-temperature modal parameters.

In the present invention, a middle portion of the sliding furnace door is fixedly connected to the triangular serrated sliding rails, the high-temperature steel bayonets on the triangular serrated sliding rails horizontally and fixedly clamp one end of the variable cross-section carbon fiber resin-based composite test piece, the dual-axis sliding rail slides the variable cross-section carbon fiber resin-based composite test piece horizontally and fixedly clamped on the sliding furnace door to the tapping threaded fixture at a middle portion of the insulation box, the tapping threaded fixture clamps the other end of the variable cross-section carbon fiber resin-based composite test piece, and the tapping threaded fixture is fixedly connected to the ceramic force transmission rod.

Because the present invention is applicable to variable cross-section carbon fiber resin-based composite test pieces, the triangular serrated sliding rails symmetrically distributed up and down and having a side length of 400 mm are fixedly connected to the sliding furnace door by steel bolts. The high-temperature sliding bayonets are fixedly slid through the serrated sliding rails, two high-temperature sliding bayonets are fixed on each single side of the triangular serrated sliding rails, and six high-temperature sliding bayonets are distributed on one triangular serrated sliding rail. The triangular serrated sliding rails symmetrically distributed up and down are spaced apart by 20 mm, which can stably clamp flat and conical pieces. A triangular water-cooled conduit is mounted on the periphery of each of the two triangular serrated sliding rails to continuously cool the triangular serrated sliding rails. The high-temperature sliding bayonets are made of chromium aluminum alloy steel that can withstand a high temperature of 1400° C. to ensure the stability of clamping in the high-temperature environment.

Because a high temperature environment of over 1000° C. is needed for a variable cross-section resin-based composite in the present invention, the combustion of the carbon fiber resin-based composite in the high-temperature environment produces a large amount of irritating gases and smoke, which will have a certain impact on the experimental environment and the physical health of experimental personnel. The mechanical pump and the exhaust valve described in the present invention are mounted on two sides of the insulation box respectively, the flange plate I fixes the mechanical pump to a lower end of one side of the insulation box, and the flange plate II fixes the exhaust valve to an upper end of one side of the insulation box. During the high-temperature experiment, argon as an inert gas is continuously introduced from the mechanical pump to keep the entire box in the protective gas, thereby preventing the combustion of the carbon fiber resin-based composite. Meanwhile, the protective gas introduced from the lower end gradually accumulates to expel the large amount of irritating gases and smoke produced during heating from the exhaust valve, thereby providing a safe and stable experimental environment.

Due to the particularity of the variable cross-section carbon fiber resin-based composite, bolt and nut locking is not suitable for fixedly connecting the test piece to an exciter for random vibration, because it easily damages the internal structure of the carbon fiber resin-based composite to affect the accuracy of high-temperature modal testing. In the present invention, without damaging the overall structure of the variable cross-section carbon fiber resin-based composite test piece, excitation is applied to the variable cross-section carbon fiber resin-based composite test piece through the high-temperature resistant ceramic force transmission rod and the tapping threaded fixture. The tapping threaded fixture consists of a tapping threaded rod, a bolt, and a bayonet, and is rigidly connected to the high-temperature resistant ceramic rod through the bolt. The threaded rod can be rotated to adjust the horizontal distance between the fixture and the variable cross-section carbon fiber resin-based composite test piece, so as to clamp one end of the variable cross-section carbon fiber resin-based composite test piece.

Because vibration excitation is required for the variable cross-section carbon fiber resin-based composite test piece in the present invention, the high-temperature resistant ceramic rod passes a Φ25 mm stepped hole at the bottom of the insulation box and is connected to the exciter. The stepped hole effectively ensures an up and down movement margin of the high-temperature resistant ceramic rod during vibration excitation. The high-temperature resistant ceramic rod has a diameter of Φ23 mm, which ensures the rigidity and strength under high temperature testing. A force sensor is mounted on an external extension segment of the ceramic rod to record the magnitude of force applied by the exciter during vibration.

The dual-axis sliding rail connects the sliding furnace door and the insulation box in a sliding manner. The dual-axis sliding rail is mounted on two sides of the outer bottom of the insulation box and consists of four high-strength steel connecting rods, which can stably and quickly slide the furnace door.

The thin armored thermocouples can withstand a high temperature of 1200° C., pass through four Φ4 mm holes evenly distributed on each of the flange plate I and the flange plate II, and are connected to a temperature recorder, to measure the temperatures of the upper and lower surfaces of the variable cross-section carbon fiber resin-based composite test piece.

The 200 mm×25 mm×50 mm vibration measuring port is formed at the outer top of the insulation box, and the vibration measuring port is made of fiberglass that can withstand 2000° C.

The 200 mm×200 mm×50 mm observation port is formed on the back of the insulation box, and the observation port is made of fiberglass that can withstand 2000° C. The tapping threaded fixture can be adjusted by opening the observation port, to clamp and fix one end of the variable cross-section carbon fiber resin-based composite test piece, and to observe the changes in the variable cross-section carbon fiber resin-based composite test piece during high-temperature vibration measurement.

The working principle of the present invention is as follows:

The 12 vertically symmetrical high-temperature sliding bayonets fixed on the sliding furnace door by steel bolts are suitable for clamping flat and conical pieces of carbon fiber resin-based composites. The dual-axis sliding rail transports the variable cross-section carbon fiber resin-based composite test piece to the tapping threaded fixture to clamp one end of the test piece, and the infrared radiation heating array arranged in parallel at the inner top of the insulation box provides radiation heating of over 1000° C. for the upper surface of the variable cross-section carbon fiber resin-based composite test piece to simulate an extreme aerodynamic thermal environment during real flight. The exciter provides vibration testing for the variable cross-section carbon fiber resin-based composite test piece through the high-temperature resistant ceramic force transmission rod and the tapping threaded fixture, to form a thermal vibration coupling environment.

Because conventional acceleration sensors cannot work normally in extreme high-temperature environments, laser from the laser vibration measurer passes through the vibration measuring port and the infrared radiation heating array to measure the vibration of the variable cross-section carbon fiber resin-based composite test piece, so as to obtain high-temperature vibration modal parameters. The mechanical pump outside the insulation box continuously introduces argon as an inert gas, to ensure that the variable cross-section carbon fiber resin-based composite test piece is tested at a high temperature in the protective gas, and to prevent combustion. The exhaust valve continuously exhausts the smoke and irritating gases produced during high-temperature testing, to provide a stable and safe experimental environment. The present invention can implement thermal vibration coupling testing on variable cross-section carbon fiber resin-based composite test pieces in safe and stable experimental environments, thereby providing test means for the stability and design feasibility of variable cross-section carbon fiber resin composite structures in aerospace flight environments.

Compared with existing technologies, the present invention has the following beneficial effects:

(1) Among existing testing technologies, most focus on alloy structures, and only some conduct modal testing on carbon fiber resin-based composites. However, most of the tests are conducted at 400° C. to 600° C., and thermal modal tests have not yet been conducted in environments above 1000° C. Due to the particularity of carbon fiber resin-based composites, the test piece is not suitable for being drilled with holes on its surface or being locked by bolts and nuts. Such a locking method easily damages the internal structure of carbon fiber resin-based composites to affect the accuracy of high-temperature modal testing. In the present invention, the infrared radiation heating array simulates and provides an extreme aerodynamic thermal environment above 1000° C. for the variable cross-section carbon fiber resin-based composite test piece, and the exciter applies random vibration to the variable cross-section carbon fiber resin-based composite test piece through the ceramic force transmission rod and the tapping threaded fixture, to simulate a thermal vibration coupling environment. Laser from the laser vibration measurer passes through the vibration measuring port and the infrared radiation heating array to measure the vibration of the variable cross-section carbon fiber resin-based composite test piece, so as to obtain high-temperature vibration modal parameters. As an advantage of the present invention, high-temperature modal testing above 1000° C. can be conducted without damaging the overall structure of the carbon fiber resin-based composite, thereby providing test means for the stability and design feasibility of variable cross-section carbon fiber resin composite structures in aerospace flight environments.

(2) The present invention is applicable to carbon fiber resin-based composite test pieces with different cross-sections. The triangular serrated sliding rails symmetrically distributed up and down are fixedly connected to the sliding furnace door by steel bolts, six high-temperature steel sliding bayonets are distributed on each triangular serrated sliding rail, the high-temperature steel sliding bayonets can slide freely on the triangular serrated sliding rails, and the 12 high-temperature steel sliding bayonets can be arranged randomly to clamp carbon fiber resin-based composite test pieces with different cross-sections.

(3) The present invention is applicable to vibration testing on carbon fiber resin-based composite test pieces of different lengths. The front end of the variable cross-section carbon fiber resin-based composite test piece is clamped by the tapping threaded fixture consisting of a tapping threaded rod, a bolt, and a bayonet, where the front end of the tapping threaded rod is fixedly connected to the bayonet, and the position of the bayonet can be adjusted by rotating the tapping threaded rod to assist in clamping the structural piece. The exciter provides vibration testing for variable cross-section carbon fiber resin-based composite test pieces of different lengths through the ceramic force transmission rod and the tapping threaded fixture.

(4) The present invention can provide a safe and stable experimental environment. The combustion of carbon fiber resin-based composites in the high-temperature environment produces a large amount of irritating gases and smoke, which will have a certain impact on the experimental environment and the physical health of experimental personnel. The mechanical pump outside the insulation box continuously introduces argon as an inert gas, to ensure that the variable cross-section carbon fiber resin-based composite test piece is tested at a high temperature in the protective gas, and to prevent combustion. The exhaust valve continuously exhausts the smoke and irritating gases produced during high-temperature testing, for testing the concentration of gases inside the insulation box and providing a stable and safe experimental environment.

(5) Because the triangular serrated steel sliding rails need to withstand thermal loads in extreme environments, the high temperature environments will affect their stiffness and strength. The steel water-cooled conduits are welded to the circumferences of the triangular serrated sliding rails. During testing, flowing water is introduced into the water-cooled conduits to cool the triangular serrated sliding rails, so as to ensure the normal operation of the triangular serrated sliding rails during high-temperature testing.

(6) Existing high-temperature acceleration sensors, which withstand a maximum temperature of 650° C., cannot work normally in extreme hot environments. The present invention adopts a laser vibration measuring method, where the fiberglass vibration measuring port that can withstand 2000° C. is formed at the top of the box, and the laser vibration measurer tests the vibration of the variable cross-section carbon fiber resin-based composite test piece to obtain dynamic response parameters of high-temperature vibration.

DETAILED DESCRIPTION OF THE EMBODIMENTS

The present invention will be further illustrated below in conjunction with the accompanying drawings and specific embodiments. It should be understood that the following specific embodiments are only used for explaining the present invention, rather than limiting the scope of the present invention. It should be noted that the terms "front", "back", "left", "right", "upper", and "lower" used in the following description refer to the directions in the accompanying drawings, and the terms "inside" and "outside" refer to the directions towards or away from the geometric center of a specific component respectively.

Figure 1:
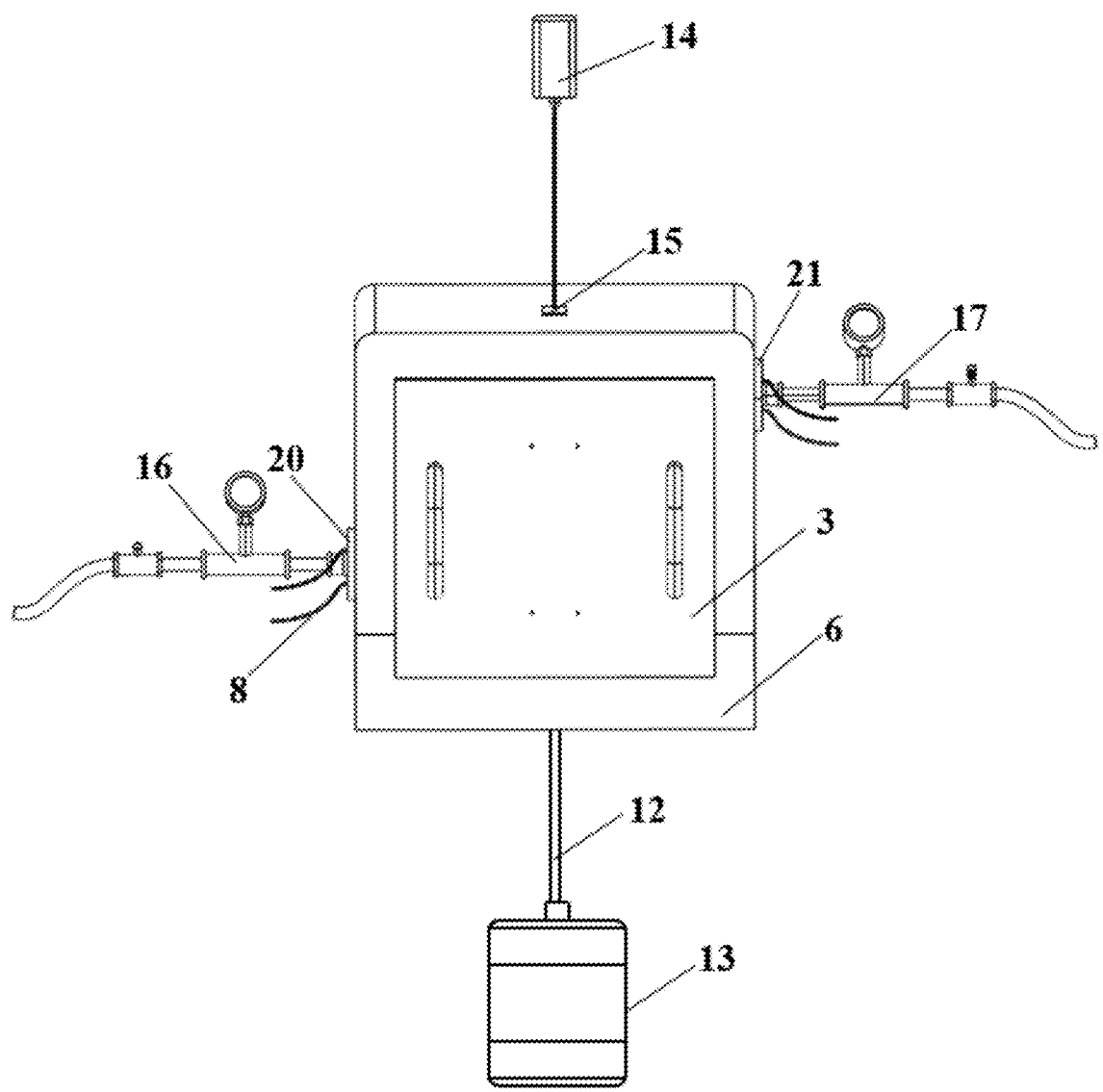
FIG. 1 is a front view of the present invention.
Figure 2:
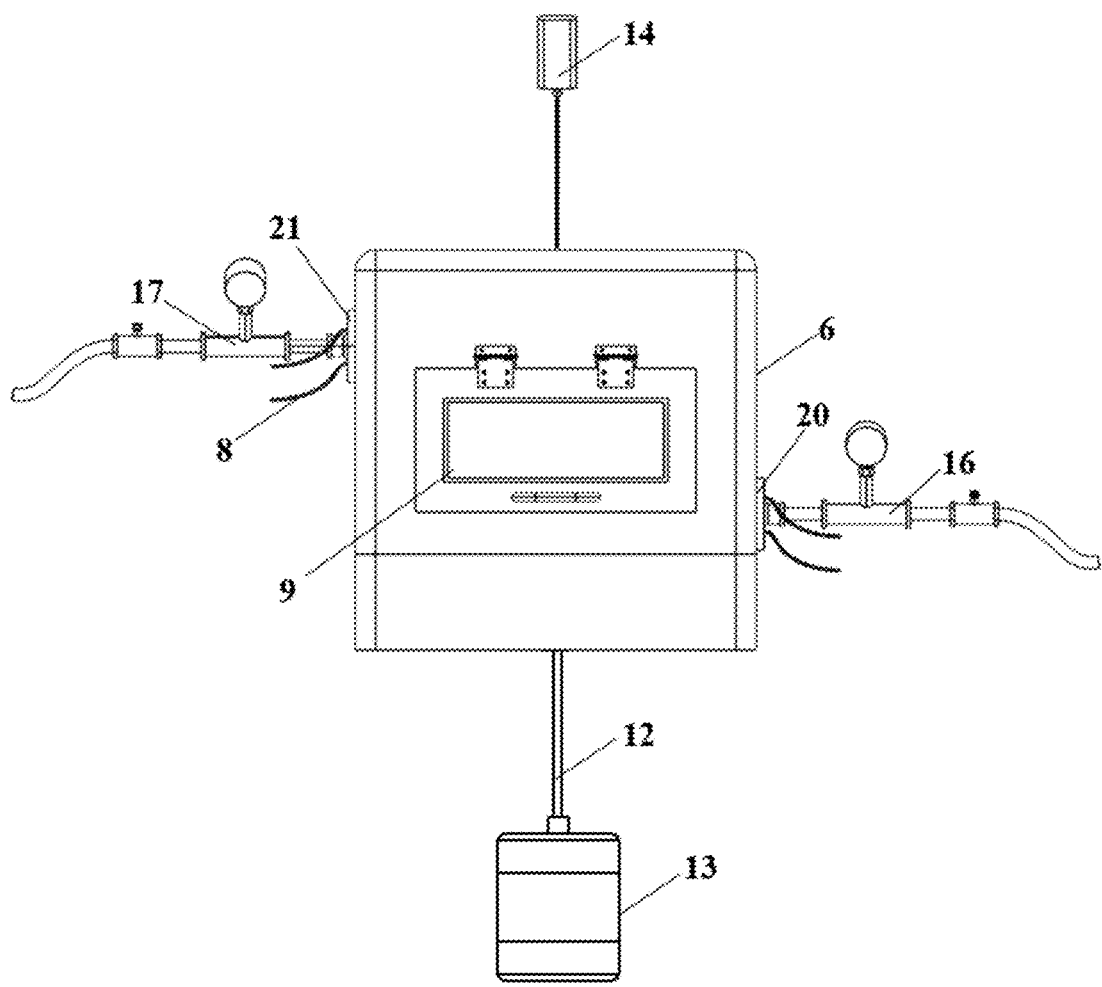
FIG. 2 is a rear view of the present invention.
Figure 3:
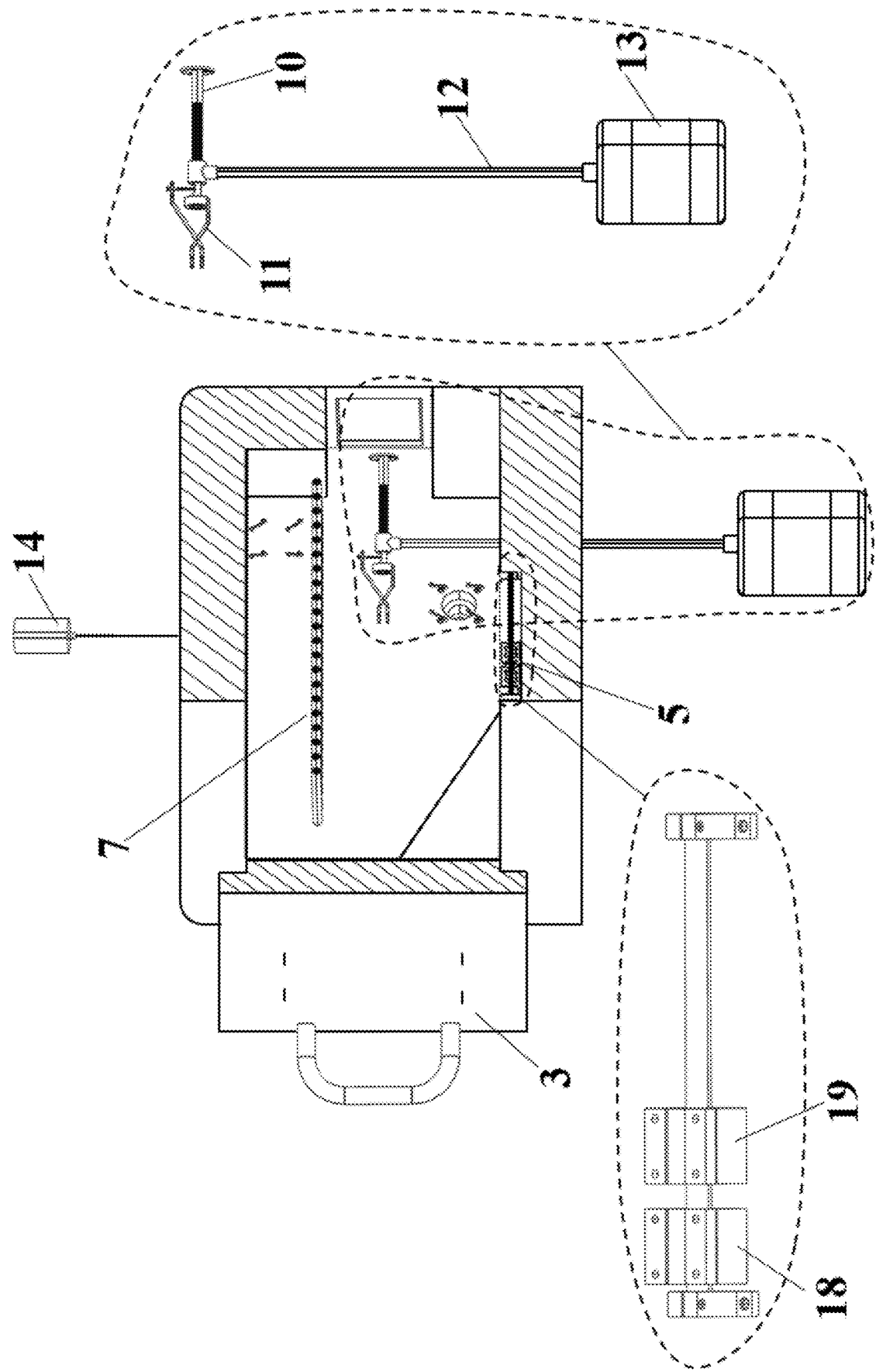
FIG. 3 is a side view of the present invention.
Figure 4:
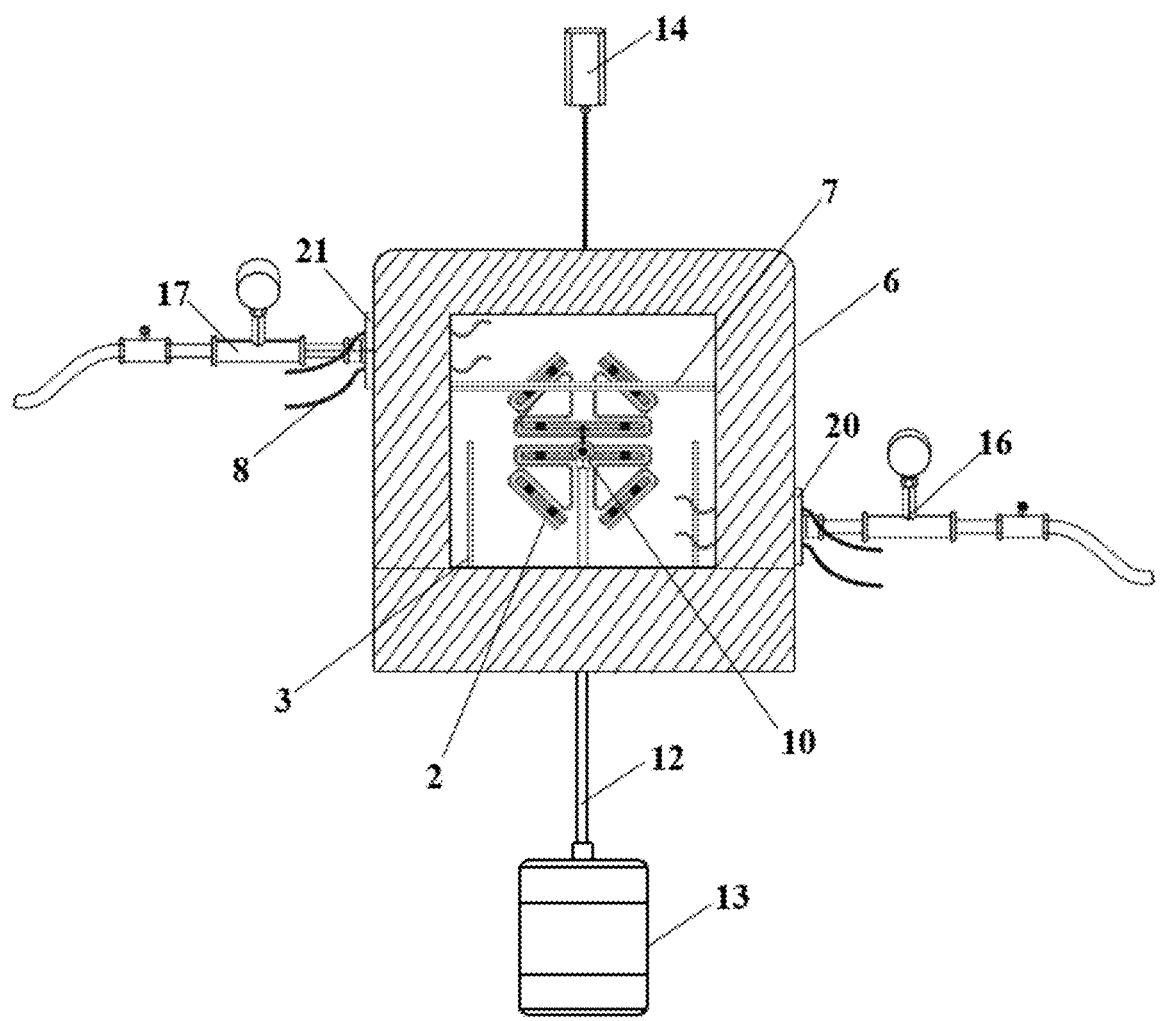
FIG. 4 is a cross-sectional view of the present invention.
Figure 5:
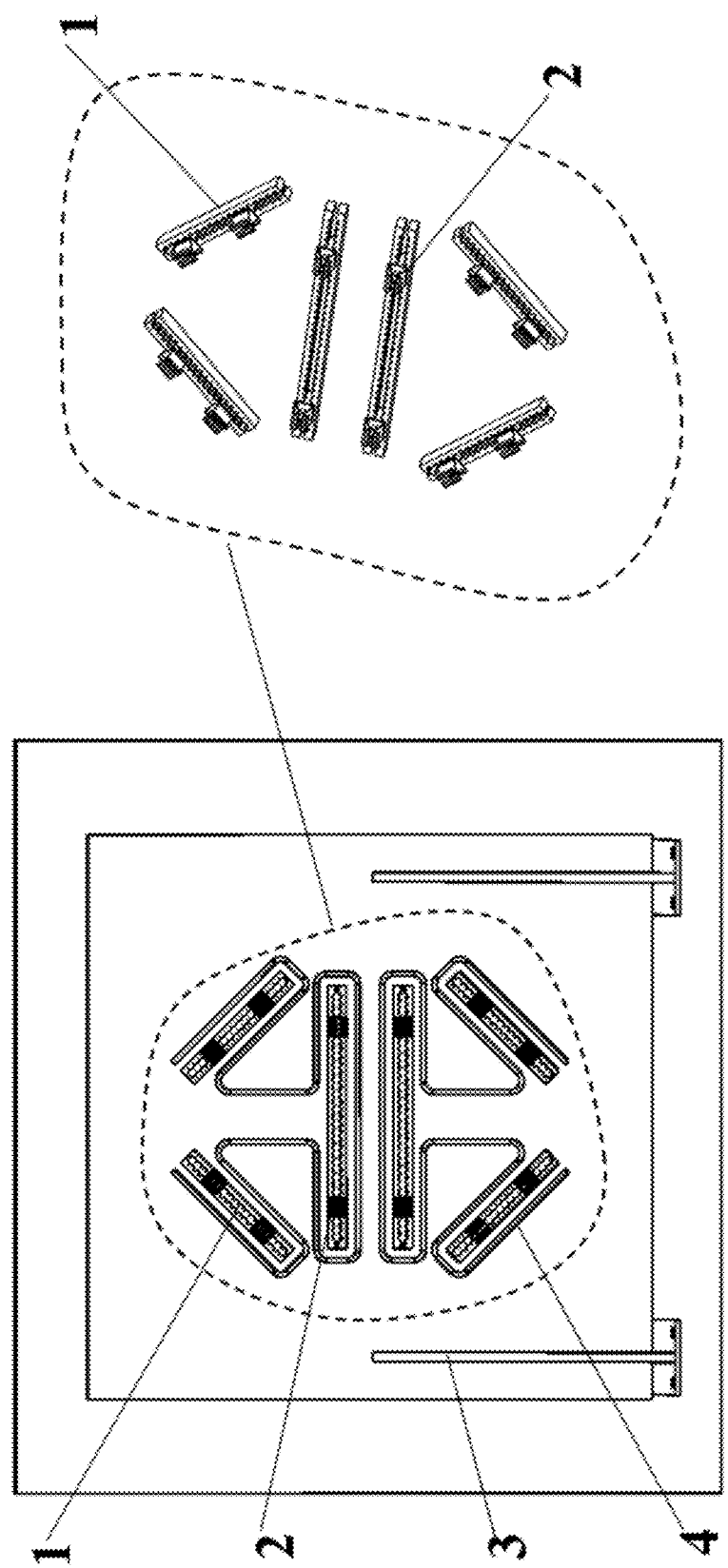
FIG. 5 is an enlarged view of a fixture of the present invention.

As shown in FIGS. 1-5, the present invention consists of triangular serrated sliding rails 1, high-temperature steel sliding bayonets 2, a sliding furnace door 3, water-cooled conduits 4, a dual-axis sliding rail 5, an insulation box 6, an infrared radiation heating array 7, thin armored thermocouples 8, an observation port 9, a tapping threaded rod 10, a tapping threaded fixture 11, a ceramic force transmission rod 12, an excitation source 13, a laser vibration measurer 14, a vibration measuring port 15, a mechanical pump 16, an exhaust valve 17, connecting rods I 18, connecting rods II 19, a flange plate I 20, and a flange plate II 21.

A variable cross-section carbon fiber resin-based composite test piece (flat or conical piece) is fixed to the sliding furnace door 3 through the triangular serrated sliding rails 1 and the high-temperature steel sliding bayonets 2 to form a cantilever structure. The water-cooled conduits 4 are welded to circumferences of the triangular serrated sliding rails 1, and introduce flowing water to cool the triangular serrated sliding rails 1. The variable cross-section carbon fiber resin-based composite test piece (flat or conical piece) is transported to the insulation box 6 by the dual-axis sliding rail 5. The infrared radiation heating array 7 is mounted at a distance from an upper end of the variable cross-section carbon fiber resin-based composite test piece (flat or conical piece) to provide a high temperature of over 1000° C., and the thin armored thermocouples 8 pass through the flange plates on two sides of the insulation box 6 and are attached to upper and lower surfaces of the variable cross-section carbon fiber resin-based composite test piece (flat or conical piece) respectively to monitor surface and back temperatures of the test piece in real time, so as to simulate an extreme aerodynamic thermal environment during real flight. Through the observation port 9 on the back of the insulation box 6, the tapping threaded rod 10 and the tapping threaded fixture 11 are adjusted to clamp one end of the variable cross-section carbon fiber resin-based composite test piece (flat or conical piece), a lower end of the tapping threaded rod 10 is connected to the ceramic force transmission rod 12 and the excitation source 13, and random vibration is provided to the variable cross-section carbon fiber resin-based composite test piece (flat or conical piece) to simulate a vibration state of the test piece during real flight. The laser vibration measurer 14 measures the vibration of the variable cross-section carbon fiber resin-based composite test piece (flat or conical piece) through the vibration measuring port 15 to obtain modal parameters under extreme thermal vibration coupling conditions.

Because the variable cross-section carbon fiber resin-based composite test piece (flat or conical piece) produces a large amount of smoke in the extreme high temperature environment of above 1000° C., the mechanical pump 16 and the exhaust valve 17 are provided on two sides of the insulation box 6, and argon as an inert gas is introduced from the mechanical pump 16 to fill the entire insulation box 6. During testing, the mechanical pump 16 and the exhaust valve 17 continue to work to avoid the production of a large amount of smoke and combustion. The present invention can implement thermal vibration coupling testing on variable cross-section carbon fiber resin-based composite test pieces in safe and stable experimental environments, thereby providing test means for the stability and design feasibility of variable cross-section carbon fiber resin composite structures in aerospace flight environments.

The technical means disclosed in the solution of the present invention are not limited to the technical means disclosed in the foregoing implementations, but also include technical solutions formed by any combination of the above technical features.

What is claimed is:

1. A high-temperature vibration modal testing device for variable cross-section carbon fiber resin-based composites, comprising: a variable cross-section carbon fiber resin-based composite test piece, triangular serrated sliding rails, high-temperature steel sliding bayonets, a sliding furnace door, water-cooled conduits, a dual-axis sliding rail, an insulation box, an infrared radiation heating array, thin armored thermocouples, a tapping threaded rod, a tapping threaded fixture, a ceramic force transmission rod, an excitation source, a laser vibration measurer, a vibration measuring port, a mechanical pump, and an exhaust valve, wherein the sliding furnace door is connected to the dual-axis sliding rail in a sliding manner, and a center of the sliding furnace door is connected to the high-temperature steel sliding bayonets by fixing first steel bolts to horizontally fix the variable cross-section carbon fiber resin-based composite test piece; the dual-axis sliding rail transports and fixes the variable cross-section carbon fiber resin-based composite test piece to the tapping threaded fixture, the ceramic force transmission rod extends to an outer side of the insulation box and is connected to the excitation source, the infrared radiation heating array is mounted at a distance of 30 mm to 40 mm from an upper surface of the variable cross-section carbon fiber resin-based composite test piece, the thin armored thermocouples are mounted on an upper surface and a lower surface of the variable cross-section carbon fiber resin-based composite test piece and connected to a temperature recorder outside the insulation box, an inert gas is introduced into the insulation box through the mechanical pump and the exhaust valve inside the insulation box, the vibration measuring port is formed at a top of the insulation box, and laser from the laser vibration measurer penetrates the vibration measuring port and the infrared radiation heating array and projects the upper surface of the variable cross-section carbon fiber resin-based composite test piece to perform vibration high-temperature modal measurement on the variable cross-section carbon fiber resin-based composite test piece.

2. The high-temperature vibration modal testing device for the variable cross-section carbon fiber resin-based composites according to claim 1, wherein two upper and lower symmetrical triangular serrated sliding rails are fixedly connected to the sliding furnace door by the first steel bolts, two high-temperature steel sliding bayonets are provided on each of three single sides of each triangular serrated sliding rail of the two upper and lower symmetrical triangular serrated sliding rails, and totally six high-temperature steel sliding bayonets on the three single sides are tightly nested and matched with each triangular serrated sliding rail; and the variable cross-section carbon fiber resin-based composite test piece is fixed on the sliding furnace door by the two upper and lower symmetrical triangular serrated sliding rails and the six high-temperature steel sliding bayonets on the three single sides of each triangular serrated sliding rail to form a cantilever structure.

3. The high-temperature vibration modal testing device for the variable cross-section carbon fiber resin-based composites according to claim 1, wherein the water-cooled conduits are welded to circumferences of the triangular serrated sliding rails, and introduce flowing water to cool the triangular serrated sliding rails.

4. The high-temperature vibration modal testing device for the variable cross-section carbon fiber resin-based composites according to claim 1, wherein the dual-axis sliding rail connects the sliding furnace door and the insulation box and comprises four connecting rods, wherein a first connecting rod on a single side of the dual-axis sliding rail is nested in a second connecting rod for sliding connection, each of the four connecting rods has a length of 400 mm, and the dual-axis sliding rail has a total length of 600 mm.

5. The high-temperature vibration modal testing device for the variable cross-section carbon fiber resin-based composites according to claim 1, wherein each of infrared radiation tubes is arranged at a distance of 50 mm on the top of the insulation box, and the laser of the laser vibration measurer passes through the infrared radiation tubes and acts on the variable cross-section carbon fiber resin-based composite test piece.

6. The high-temperature vibration modal testing device for the variable cross-section carbon fiber resin-based composites according to claim 1, wherein the ceramic force transmission rod is connected to the tapping threaded fixture by a second steel bolt and arranged inside the insulation box; the tapping threaded fixture comprises the tapping threaded rod, a bolt, and a bayonet, wherein a front end of the tapping threaded rod is fixedly connected to the bayonet, and a position of the bayonet is allowed to be adjusted by rotating the tapping threaded rod to assist in clamping a front end of the variable cross-section carbon fiber resin-based composite test piece.

7. The high-temperature vibration modal testing device for the variable cross-section carbon fiber resin-based composites according to claim 1, wherein the vibration measuring port has a size of 200 mm×25 mm×50 mm, and the vibration measuring port is made of fiberglass, wherein the fiberglass is configured to withstand 2000° C.; a $\Phi 25$ mm stepped hole is formed at a bottom of the insulation box, and the ceramic force transmission rod passes through the $\Phi 25$ mm stepped hole and is rigidly connected to the tapping threaded rod to provide a margin of up and down vibration for the ceramic force transmission rod.

8. The high-temperature vibration modal testing device for the variable cross-section carbon fiber resin-based composites according to claim 1, wherein an observation port with a size of 200 mm×200 mm×50 mm is formed on a back of the insulation box, and the observation port is made of fiberglass, wherein the fiberglass is configured to withstand 2000° C.

9. The high-temperature vibration modal testing device for the variable cross-section carbon fiber resin-based composites according to claim 1, wherein the mechanical pump and the exhaust valve are mounted on a first side and a second side of the insulation box respectively, a first flange plate fixes the mechanical pump to a lower end of the first side of the insulation box, a second flange plate fixes the exhaust valve to an upper end of the second side of the insulation box, four $\Phi 4$ mm holes are evenly distributed on each of the first flange plate and the second flange plate, and the thin armored thermocouples pass through the four $\Phi 4$ mm holes and are connected to the upper surface and the lower surface of the variable cross-section carbon fiber resin-based composite test piece and the temperature recorder outside the insulation box.

\* \* \* \* \*